United States Patent Office 3,655,736
Patented Apr. 11, 1972

3,655,736
PREPARATION OF ENOL ESTERS FROM ALLENES
Charles J. Norton, Denver, and Byron C. Diehl, Allenspark, Colo., assignors to Marathon Oil Company, Findlay, Ohio
No Drawing. Filed May 1, 1968, Ser. No. 725,926
Int. Cl. C07c *67/04*
U.S. Cl. 260—497 R
21 Claims

ABSTRACT OF THE DISCLOSURE

Enol esters are prepared by reacting allene and its derivatives and carboxylic acids in the presence of a catalyst wherein from about 0.01 to about 100 moles of allene or allene derivatives are present per mole of carboxylic acid at a temperature of from about 25 to about 500° C. at the desired pressure.

CROSS REFERENCE TO RELATED APPLICATIONS

No related United States patent applications are known to the inventors.

BACKGROUND OF THE INVENTION

The field of this invention especially relates to synthesis of isopropenyl acetate (also known as 2-acetoxy-1-propene).

Heretofore, isopropenyl acetate has been prepared by such methods as: reacting methyl acetylene with acetic acid in the presence of boron trifluoride etherate catalyst; reacting acetone with ketene in the presence of sulfuric acid. Such methods have often proved substandard in that the yields of isopropenyl acetate are low.

The method of this invention is a novel process for the preparation of enol esters, one of which is isopropenyl acetate, in excellent yields economically and without the necessity for using special reacting equipment or prohibitively expensive reactants.

SUMMARY OF THE INVENTION

This invention relates basically to the preparation of enol esters in good yields by reacting allenes or a stream containing allenes with carboxylic acids in the presence of a catalyst wherein optimization of yields are produced by varying the temperature and pressure conditions along with the catalyst used.

By enol esters are meant compounds of the structure:

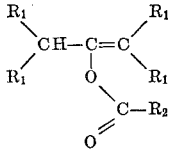

where the $R_1$'s comprise up to ten carbon atoms and may or may not be the same, and $R_2$ comprises up to nine carbon atoms. The exact structure of the enol ester will be readily determined when the starting materials are characterized, as described in the preferred embodiments of this invention. By reacting a mixture of allene(s) and low molecular weight carboxylic acid(s), product mixtures of various enol esters are formed, which may be separated by conventional means if desired.

A modification of this invention involves utilizing a mixture of hydrocarbons containing allene and other low molecular weight hydrocarbons typified by MAPP gas as the reactant in place of allenes. MAPP is the registered trade mark of a fuel introduced by the Dow Chemical Company which basically comprises a mixture of methyl acetylene, allene, propane and propylene. It is generally produced by cracking propylene or isobutylene or their mixtures. MAPP gas has found some utility as a cutting fuel, but does not have the quality of acetylene suitable for welding or similar purposes. Since the MAPP gas is readily available from ordinary hydrocarbon cracking operations, there has been considerable effort to find economical uses for this gas cut. The present invention describes, as one preferred embodiment, a method for economically utilizing MAPP gas as a reactant in the preparation of isopropenyl acetate. The use of MAPP gas as a reactant in the present invention is possible because of the fact that a large portion of the gas, specifically the methyl acetylene and allene components, will react with acetic acid in the presence of a suitable catalyst to form the desired product, isopropenyl acetate.

Isopropenyl acetate has many uses, some of which are described in "Reactions of Isopropenyl Acetate," Industrial and Engineering Chemistry, vol. 41, No. 12, pp. 2920–2924. Thus, isopropenyl acetate is an excellent enol acetylating agent which reacts with enolizable compounds, that is, compounds containing at least one hydrogen atom on a carbon atom adjacent to the carbon enol group, to form enol acetates. Isopropenyl acetate is also a valuable monomer which can be polymerized or copolymerized to form useful and valuable materials. Thus, fibers may be formed by a copolymerization reaction between vinyl chloride and isopropenyl acetate. Also, colorless resins may be formed by the copolymerization reaction of isopropenyl acetate with esters of maleic and fumaric acids. Further, the utility of copolymers formed from the copolymerization reaction of vinyl acetate with isopropenyl acetate is described in German Pat. No. 1,026,064.

Other enol ester products of this invention are similarly useful, especially as monomers to be polymerized or copolymerized.

The foregoing modes of utility are merely illustrative of a vast number of different uses known to those familiar with the chemistry of enol esters.

PREFERRED EMBODIMENTS OF THE INVENTION

The preferred embodiment of this invention involves carboxylic acid and allene derivatives as the starting materials, wherein there are present in the reaction mixture preferably from about 0.01 to about 100 moles and more preferably from about 0.1 to about 10 and most preferably from about 0.5 to about 5 moles of allene derivative per mole of carboxylic acid.

The carboxylic acids useful for the purposes of this invention are of low molecular weight and have preferably carbon numbers from $C_1$ through $C_{10}$, and more preferably $C_2$ through $C_6$, with acetic acid and propionic acid most preferred.

The allene derivatives or allenes, as synonymously referred to herein, have the structure:

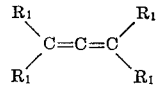

where the $R_1$'s contain up to ten carbons and are the same or different and are preferably alkyl, aryl, cycloalkyl, aralkyl, or hydrogen. The more preferred $R_1$'s are alkyl $C_1$ through $C_5$, such as methyl, ethyl, propyl, isopropyl, and hydrogen with the most preferred starting material being the parent homolog, allene.

The reaction merely comprises these reactants so that additional components which are inert with respect to the reaction forming enol esters may be present. A mixture of low molecular weight hydrocarbons containing about 1 to 99 weight percent allene and from about 10 to 50 weight percent methylacetylene plus possibly other aliphatic and olefinic hydrocarbons containing preferably less than about 5 carbon atoms per molecule would be useful as a reactant with a carboxylic acid. In general there would be from about 0.01 to about 100 moles of this mixture per mole of carboxylic acid present in the reaction mixture. Thus, MAPP gas whose major proportion comprises allene, methyl acetylene, propane and propylene is a useful reactant for the present invention.

Other components found in a typical MAPP gas cut such as aliphatic and olefinic hydrocarbons containing approximately 4 carbon atoms or less, do not interfere with the reaction of allene and methyl acetylene with acetic acid to form the product isopropenyl acetate. If desired, the product mixture formed when utilizing a MAPP gas cut as the source of allene with carboxylic acid may be separated to produce a highly pure enol ester product. For example, fractional distillation may be used to separate high purity enol esters from a reaction product mixture.

When utilizing MAPP gas as a reactant, there are preferably from about 0.01 to about 100, and more preferably from about 0.05 to about 50, and most preferably from about 2 to about 20 moles of MAPP gas per mole of carboxylic acid in the reacting vessel. In general, the mole ratio of MAPP gas to carboxylic acid will depend on the particular composition of MAPP gas cut.

A variety of transition metal compounds, especially salts, are useful as catalysts in this reaction. The preferred cation components are selected from groups IIB and VIII of the Periodic Table, more preferred from these two groups in descending order of preference are mercury, zinc, cadmium, and palladium. The preferred anions are organic, preferably carboxylates exemplified by acetate, propionates, butyrates, and the like, inorganic exemplified by oxides, carbonates, halides, nitrates, and sulfates. Preferably the catalyst should be soluble under the reaction conditions, with the most preferred being mercuric acetate. Mixtures of these transition metal salts may also be used. Preferably there will be from .001 to about 0.5 and more preferably from 0.01 to about .25 and most preferably from 0.05 to about 0.1 mole of catalyst in the reaction mixture per mole of carboxylic acid.

The reaction media should be of such a nature as to prevent the homopolymerization of the reactants and products during the reaction and recovery operation. A free radical inhibitor such as phenols, naphthaquinone, and hydroquinone can be added in 0.01 to 1 weight percent concentration to reduce polymerization.

In the most preferred embodiment of this invention an excess of carboxylic acid starting material is used to act as the solvent for the reaction mixture, as well as concurrently acting as a reactant. Although the preferred solvents are acetic and propionic acids or other $C_1$ through $C_{10}$ carboxylic acids, in addition a cosolvent such as acid anhydride may be used to remove water and minimize the hydrolysis of the product enol ester. The amount of cosolvent employed may range from 0.1 weight percent up to 10 weight percent of the total solvent-reactant.

In general, there will be preferably from about 0.01 to about 100 and more preferably from about 0.05 to about 50 and most preferably from about 2 to about 20 moles of solvent per mole of allene derivative.

As to the desired temperature and pressure conditions for this reaction, it is only important that the preferred solvents or mixture of preferred solvents be stable and inert with respect to the desired product and be present in the liquid phase under the reaction conditions. It is preferred that the excess solvent-reagent be conveniently recovered, for example by fraction distillation for recycle.

Although not narrowly critical, the temperature of reaction is preferably from about 25 to about 500 and more preferably from about 50 to about 250 and most preferably from about 100 to about 200° C.

Also, the pressure of the reaction is not narrowly critical, although in general the reaction is preferably conducted under atmospheric conditions or super-atmospheric pressures, although sub-atmospheric pressures may be utilized as desired. The criticality of temperature and pressure lies only in optimization of this reaction in obtaining the highest yield.

The reaction preferably takes from about 0.01 to about 100, and more preferably from about 0.05 to about 50 and most preferably from about 0.1 to about 10 hours, although in general this time element is not narrowly critical to the final product determination. In general, when the preferred catalyst is utilized, along with the most preferred mole ratios of solvents and reactants, the time of reaction will be minimized.

Although the following examples describe the invention on a batch basis, it may, of course, be practiced on a continuous basis with continuous flows of starting materials into the reactor.

In the following examples, the reaction product is analyzed by work-up, gas liquid chromatography (GLC), infra-red spectrum analysis, and use of the standard iodoform test. Specifically, the reaction procedure of all six examples is the same although the analytical procedure varies, with a standard work-up procedure used in Examples I and II and primarily GLC is used in Examples III–VI. A summary of the results of these latter examples including the additional Examples V and VI is presented in Table 1.

EXAMPLE I

A 250 ml. round-bottom flask is equipped with a magnetic stirrer, condenser, thermometer, thermocontroller, an allene reservoir tank, gas line, control valve, flow meter, bubbler, and down stream Dry-Ice trap on the exit line. The flask is charged with 123 ml. (2.12 moles) of glacial acetic acid, 32.0 g. (0.10 moles) mercuric acetate, and 0.4 g. of hydroquinone, and heated to 70° C. with an allene input flow of 55 cc./min. (0.15 mole/hr.) at STP for 14 hours. Allene starts to accumulate in the Dry-Ice trap only at the end of this time period. The reaction vessel weight increase indicates the absorption of 8.5 g. of allene for the total 84 g. (2.1 mole) allene fed. This represents a conversion of up to 10 percent. The formation of isopropenyl acetate is indicated by a positive iodoform test on the solution after treatment with 10 percent aq. sodium hydroxide to yield acetone.

EXAMPLE II

The reaction is repeated in a sealed tube, manufactured by the Fischer-Porter Company. A Dry-Ice chilled 50 ml. Fischer-Porter tube is charged with 13.2 g. glacial acetic acid (0.22 mole), 3.18 g. $Hg(OAc)_2$ (0.010 mole), 0.2 g. hydroquinone, and 8.08 g. allene (0.20 mole). The tube is capped and weighed, and then heated and shaken at 110° C. for 135 minutes. The cooled vessel, after reaction, contains a light-yellow, clear solution without any precipitation. There is no loss in weight on warming the solution to 30° C., indicating substantial reaction of the allene. The solution weighs 22.01 g. A few drops of the solution gives a strong positive iodoform test. The balance of the solution, 20.95 g., is worked up by pouring into several volumes of water, extracting with ether, filtering, rinsing to neutrality, drying, and removing the ether by evaporation yielding 1.28 g. of oil. This oil has all the infra-red band characteristics of authentic isopropenyl acetate (Sadler Reference Spectrum No. 772). GLC indicates the product has one major peak, characteristic of isopropenyl acetate, indicating 80.5 weight percent of this material in the product fraction.

EXAMPLE III

The reaction is repeated using liquefied MAPP gas (Analysis: 0.33% ethane, 31.32% propane, 8.11% propylene, 0.23% isobutane, 4.24% n-butane, 28.84% allene, 26.37% methylacetylene, 0.38% unkown, 10.03% butene-1, 0.14% isobutene, and a trace of 1,3-butadiene). The total allene-methylacetylene content is 55.21 weight percent. The Dry-Ice chilled Fischer-Porter tube is charged with 14.4 g. of liquid MAPP gas (~0.2 mole allene-methylacetylene), 13.2 g. glacial acetic acid (0.22 mole), 3.184 g. Hg(OAc)₂ (0.01 mole). The Fischer-Porter tube is sealed and heated at 110° C. for 135 minutes. The warm solution contains a large volume of white organo-mercury salt precipitate. 12.3 g. of condensed gas is recovered in a Dry-Ice trap. 10.89 g. of liquid is poured out.

The reaction solution gives a strongly positive iodoform test. GLC of the liquid phase indicates the presence of 39.0 weight percent isopropenyl acetate.

EXAMPLE IV

A Dry-Ice chilled Fischer-Porter tube is charged with 0.2 g. hydroquinone, 3.18 g. Hg(OAc)₂, 13.2 g. glacial acetic acid, and 7.96 g. allene (0.199 mole). The tube is heated and shaken at 110° C. for 120 minutes. The tube is opened and 21.35 g. liquid decanted. GLC analysis of liquid shows it to be 69.68% isopropenyl acetate (0.1486 mole), which is a yield of 74.7%.

As indicated in Table 1, use of allene as a starting material according to the practice of this invention gives isopropenyl acetate yields (over 70%) far superior to the prior art method of preparing isopropenyl acetate by reacting methyl acetylene, exemplified by Example VI (13.5% yield).

TABLE 1.—ADDITION OF ACETIC ACID CATALYZED BY MERCURIC ACETATE

| Run | Feed material | Yield [1] isopropenyl acetate | Total feed recovered moles | Percent conversion [3] |
|---|---|---|---|---|
| Ex. III [2] | MAPP | 27.7 | [2] 10.019 | 29.5 |
| Ex. IV | Allene | 74.7 | 0.0095 | 95.2 |
| Ex. V | do | 72.7 | 0.0185 | 90.4 |
| Ex. VI | Methyl acetylene | 13.5 | 0.1097 | 46.4 |

[1] Moles product from moles of feed charged, uncorrected for recovered eed.
[2] Computed on weight basis; others on mole basis.
[3] $\frac{\text{Moles Charged} - \text{Moles Recovered}}{\text{Moles Charged}} \times 100$ It should be understood that the invention is capable of a variety of modifications and variations which will be made apparent to those skilled in the art by a reading of the specification and which are to be included within the spirit of the claims appended hereto.

What is claimed is:

1. A process for the preparation of enol esters comprising reacting a low molecular weight $C_1$–$C_{10}$ alkanoic acid with from about 0.01 to about 100 moles of a compound having the structure:

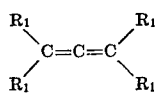

where the $R_1$'s contain up to ten carbon atoms and may be the same or different and are selected from the group consisting of alkyl, cycloalkyl and hydrogen per mole of said low molecular weight alkanoic acid at a temperature of from about 25 to about 500° C. in the presence of a catalytic amount of a soluble mercury, zinc or cadmium, salt.

2. The process of claim 1 wherein $R_1$ is hydrogen.

3. The process of claim 1 wherein the low molecular weight alkanoic acid is selected from the group consisting of acetic acid and propionic acid.

4. The process of claim 1 wherein the alkanoic acid is acetic acid.

5. The process of claim 1 wherein the reaction is conducted in the presence of from 0.001 to 0.5 mole of said salt per mole of said alkanoic acid.

6. The process of claim 1 wherein the catalyst is mercuric acetate.

7. The process of claim 1 wherein a mixture of enol esters is produced by reacting a mixture of low molecular weight alkanoic acids with a mixture of compounds of the structure

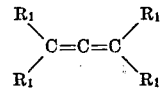

8. The process of claim 7 wherein the reaction is conducted in the presence of from 0.001 to 0.5 mole of said salt per mole of said alkanoic acid.

9. The process of claim 1 wherein the reaction is carried out in the presence of a solvent selected from the group consisting of $C_1$–$C_{10}$ alkanoic acids wherein there are about from 0.01 to 100 moles of solvent present per mole of compound of the structure

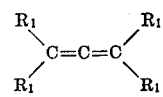

10. A process for the preparation of isopropenyl acetate comprising reacting from about 0.01 to about 100 moles of allene per mole of acetic acid at a temperature of from about 25 to about 500° C. in the presence of a catalytic amount of a mercury, zinc or cadmium, salt which is soluble under the reaction condition.

11. The process of claim 10 wherein the reaction is conducted in the presence of from 0.001 to 0.5 mole of said salt per mole of said acetic acid.

12. The process of claim 10 wherein the reaction is carried out in the presence of a solvent selected from the group consisting of $C_1$–$C_{10}$ alkanoic acids wherein there are about from 0.01 to 100 moles of solvent present per mole of allene.

13. A process for the preparation of enol esters from a mixture of hydrocarbons which mixture comprises from about 1 to about 99 weight percent allene, and from about 10 to 50 weight percent methylacetylene, and other aliphatic and olefinic hydrocarbons containing less than 5 carbon atoms, comprising reacting from about 0.01 to about 100 moles of said mixture per mole of low molecular weight alkanoic acid at a temperature of from about 25 to about 500° C. in the presence of a catalytic amount of a mercury, zinc or cadmium or salt soluble under the reaction condition.

14. The process of claim 13 wherein the mixture of hydrocarbons is liquefied and the reaction is conducted in the liquid phase.

15. The process of preparing isopropenyl acetate by the process of claim 13 wherein acetic acid is the low molecular weight alkanoic acid used.

16. The process of claim 13 wherein the reaction is conducted in the presence of from 0.001 to 0.5 mole of said salt per mole of said carboxylic acid.

17. The process of claim 15 wherein the reaction is conducted in the presence of from 0.001 to 0.5 mole of said salt per mole of said carboxylic acid.

18. The process of claim 13 wherein the reaction is carried out in the presence of a solvent selected from the group consisting of $C_1$–$C_{10}$ alaknoic acids wherein there are about from 0.01 to 100 moles of solvent present per mole of mixture of hydrocarbons comprising allene.

19. The process of claim 15 wherein the reaction is carried out in the presence of a solvent selected from the group consisting of $C_1$–$C_{10}$ alkanoic acids wherein there are about from 0.01 to 100 moles of solvent present per mole of mixture of hydrocarbons comprising allene.

20. The process of claim 12 wherein the solvent is provided by using an excess of acetic acid.

21. The process of claim 10 wherein the salt is mercuric acetate.

References Cited

UNITED STATES PATENTS 3,574,717   4/1971   Lloyd _____ 260—497
3,221,045   11/1965  McKeon et al. _____ 260—497

FOREIGN PATENTS 615,596   9/1962   Belgium _____ 260—497

JAMES A. PATTEN, Primary Examiner

V. GARNER, Assistant Examiner

U.S. Cl. X.R.

260—410.9 N, 498

UNITED STATES PATENT OFFICE
CERTIFICATE OF CORRECTION

PO-1050
(5/69)

Patent No. 3,655,736     Dated April 11, 1972

Inventor(s) Charles J. Norton, Byron C. Diehl

It is certified that error appears in the above-identified patent and that said Letters Patent are hereby corrected as shown below:

Col. 1, line 67: "MAPP is" should read --MAPP gas is--

Col. 5, line 30  phrase omitted. Should read --(2 hrs @ 110°C in Fischer-Porter Tubes)--

Col. 5, line 33: "10.019" should read --10.019 g --

Col. 5, line 37: "eed" should read --feed--

Col. 6, line 45: "10 to 50" should read --10 to about 50--

Col. 6, line 52: "cadmium or salt" should read --cadmium salt--

Signed and sealed this 25th day of July 1972.

(SEAL)
Attest:

EDWARD M. FLETCHER, JR.
Attesting Officer

ROBERT GOTTSCHALK
Commissioner of Patents